March 30, 1937. J. W. KAMERER 2,075,726

METHOD OF HEATING SAFETY GLASS ASSEMBLIES

Filed May 4, 1935 2 Sheets-Sheet 1

INVENTOR.
JAMES W. KAMERER
BY
ATTORNEYS.

Patented Mar. 30, 1937

2,075,726

UNITED STATES PATENT OFFICE 2,075,726

METHOD OF HEATING SAFETY GLASS ASSEMBLIES

James W. Kamerer, New Kensington, Pa., assignor to Duplate Corporation, a corporation of Delaware Application May 4, 1935, Serial No. 19,837

3 Claims. (Cl. 49—81)

Figure 1:
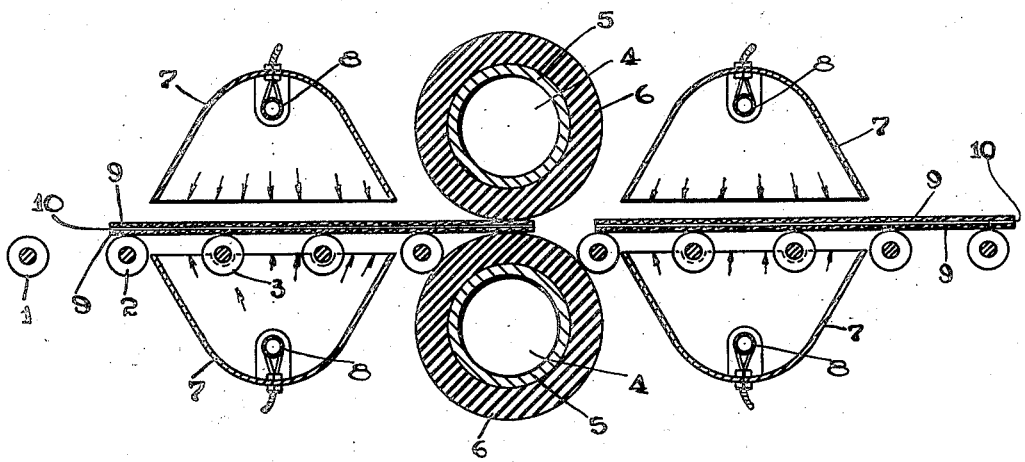
Figure 3:
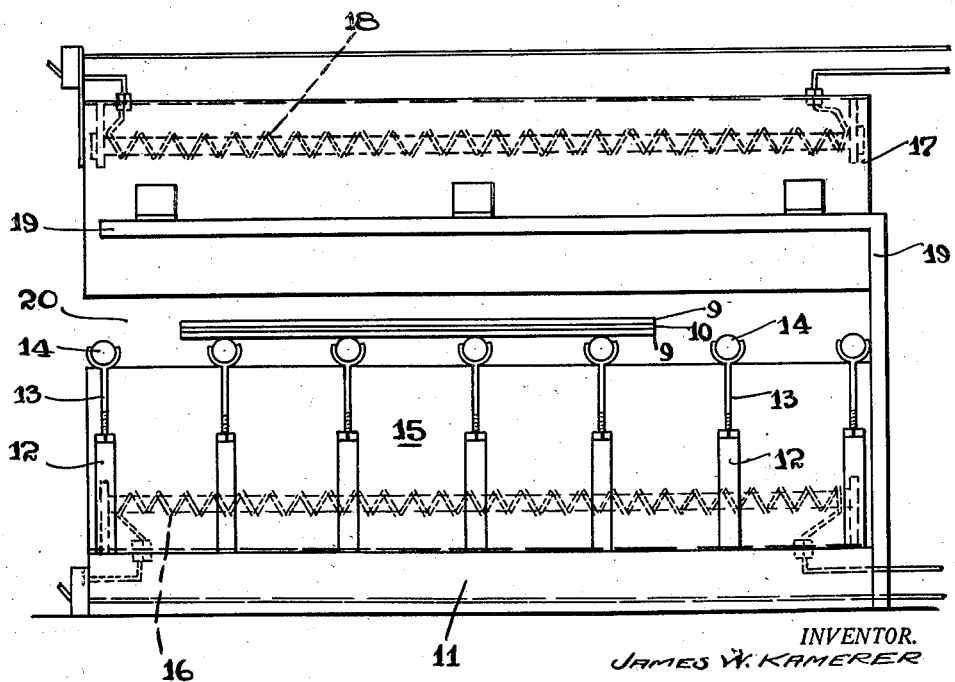
Figure 2:
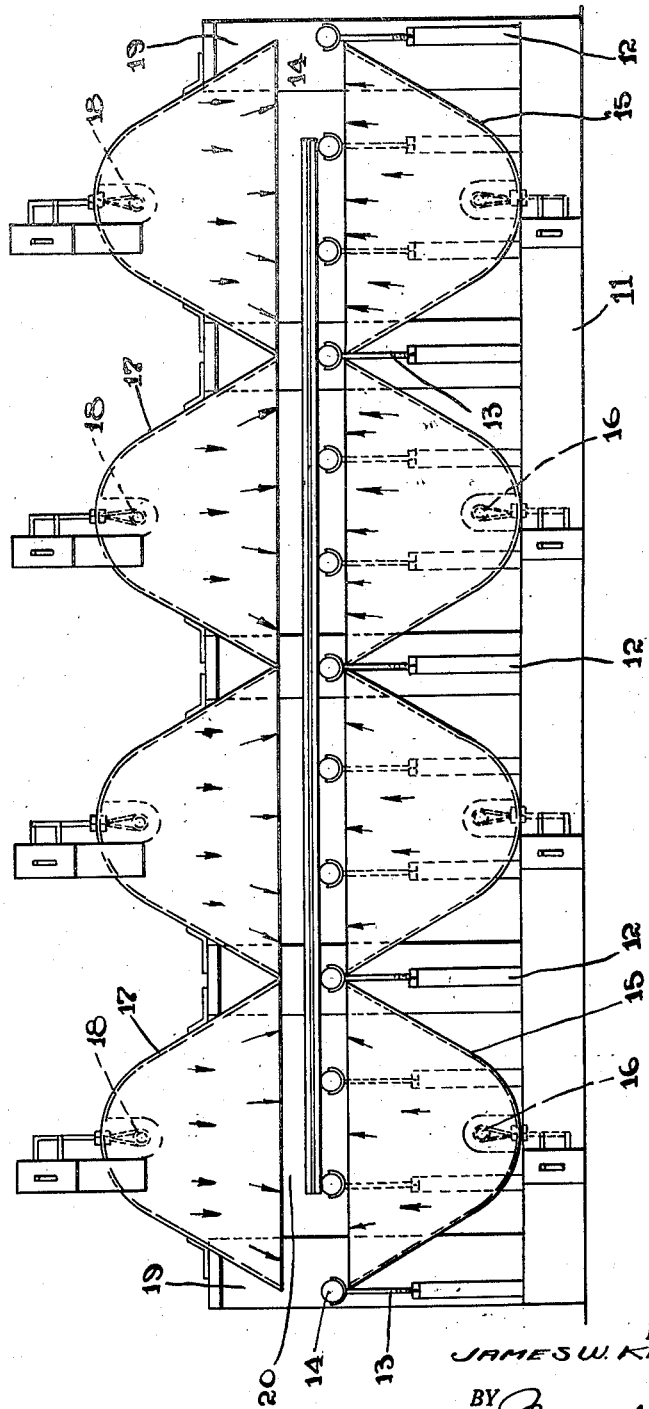

The invention relates to a method of heating safety glass assemblies comprising a pair of glass sheets and an interposed sheet of reinforcing, such as cellulose nitrate plastic, synthetic resin, or the like. In preliminarily pressing the sheets between nipper rolls to secure them together, it is necessary to heat the assembly to a point where the plastic softens and conforms itself to the glass surfaces. This has been done heretofore by passing the assemblies through a heating medium, such as diethyl glycol, or a heated atmosphere. Since the glass is a poor conductor of heat, the time required for the heat to penetrate and soften the plastic is relatively long, and the assemblies must be carried a considerable distance through the heating medium in order to secure the desired heating of the plastic. I have found that the heating effect can be much more rapidly and economically accomplished by the use of radiant heat which will penetrate the glass sheets and heat the plastic with only a limited absorption of heat by the glass. When the heat radiating surface is maintained at a temperature of upwards of 1500 deg. F., preferably around 1700 to 1800 deg. F., the heat waves are largely transmitted through the glass and absorbed by the plastic which is less transparent than the glass, and because of its chemical composition more readily heated by heat waves of the length produced by the radiant body. As a result, the heating operation progresses rapidly and the glass sheets are, after the heat treatment, at a substantially lower temperature than where the treatment is accomplished by the use of liquids or by a heated atmosphere in accordance with previous procedure. The process is also applicable in heating safety glass in cutting operations, wherein it is necessary, after scoring and cracking the glass sheets, to heat the plastic to its softening point so that it can be stretched to tear the plastic or to permit the insertion of a cutting tool. This heating has heretofore been done in a hot bath of liquid or by the use of electrically heated elements placed along the line of scoring. By the use of radiant heat, as heretofore described, the heating operation is accomplished quickly and economically and the glass sheets are maintained at a lower temperature and are easier to handle. Apparatus for utilizing the process for both of the purposes above set forth is shown in the accompanying drawings, wherein:

Figure 1 is a vertical section through an apparatus involving the use of the improved apparatus for preliminarily pressing assemblies of glass and reinforcing material. Fig. 2 is a side elevation of an apparatus for use in heating safety glass in connection with a cutting operation. And Fig. 3 is an end elevation of the apparatus of Fig. 2.

Referring to the operation involving the use of nipper rolls, as shown in Fig. 1, the reference numerals 1, 2 and 3 indicate driven rolls constituting a runway over which the plates to be laminated are carried. In the line of travel of the sheets or plates are a series of pairs of presser rolls 4, 4 which are also driven and comprise the hollow steel pipes 5, 5 that are covered with the rubber treads 6, 6 to avoid injury to the surfaces of the glass sheets. Also arranged along the line of travel of the glass sheets on either side thereof are the parabolic reflectors 7, 7 provided with the electrical heating units 8, 8 preferably in the form of nickel chromium coils extending the length of the reflectors and entirely across the width of the glass sheets. As illustrated, each assembly consists of a pair of glass sheets 9, 9 with an interposed sheet 10 of reinforcing material, such as cellulose nitrate plastic.

Preliminary to passing the sets of plates along the runway, the inner faces of the glass sheets are coated with a suitable cement, such as gelatin, and the three sheets are then assembled as shown and carried slowly along the runway between the heating elements and the presser rolls which apply the necessary pressure to cause the glass sheets to be cemented securely to the sheet of plastic.

The heating elements 8, 8 are heated to a temperature of about 1700 or 1800 deg. F., and at this temperature, the heat rays, both direct and reflected, are of such length that they pass freely through the glass sheets 9 and are absorbed by the cellulose plastic, so that it is quickly heated to the softening point, which is at a temperature of approximately 200 deg. F. The glass sheets being themselves diathermanous absorb only a small proportion of the heat, so that the heating effect is concentrated upon the plastic. The laminated plates as they emerge from the apparatus are, therefore, at a relatively lower temperature than is the case when the sheets are heated by methods heretofore employed, such as by contact with the heated atmosphere or by contact with a heated liquid.

Figs. 2 and 3 illustrate the apparatus employed in cutting safety glass, wherein the safety glass is first scored on each side and cracked, and then heated until the reinforcing plastic is softened, thus permitting the ready separation of the plastic at the line of scoring either by tearing or by cutting. The apparatus, as here shown, comprises a base 11 carrying posts 12 distributed over the area of the base, and each provided with a stem 13 with a cup in its upper end, in which is mounted an anti-friction ball 14. These balls constitute the bed or support for the glass during the heating operation, and their use permits the glass to be slid in edgewise over the balls without injury to the surface. Carried by the base are a series of parabolic reflectors 15, 15, etc., each provided with a heating element 16 similar to those described in connection with Fig. 1. Lying above the base of the apparatus is a hood made up of the reflectors 17, 17, etc., each provided with a heating element 18 similar to the heating element 16. The edges of the upper reflectors 17, 17, etc. are spaced from the edges of the reflectors 15, 15, etc. by means of brackets 19 to provide a slot 20, which extends around three sides of the apparatus, so that the plates to be cut can be inserted either from the ends of the apparatus or from the side. In operation, the two glass sheets are scored in opposition and the glass is cracked before placing it in the heating apparatus. It is then inserted through the slot 20 to the position shown in Figs. 2 and 3, and allowed to remain in this position until the plastic has softened. The plate is then removed and tension is applied to stretch the plastic slightly at the line of scoring, thus permitting of the insertion of a thin bladed cutting tool to scratch or cut the plastic. The operation of heating can be carried out very quickly upon this apparatus, and when the plate is removed from the apparatus, it is at a relatively lower temperature than in those cases in which the plate is heated in a bath of oil or water to soften the plastic. As a result, it is easier to handle the plate in performing the last step of the operation, which consists in severing the plastic.

In order to speed up the operation in both types of construction, reflectors and heating elements are employed on both sides of the sheets treated, but it will be understood that similar results taking a somewhat longer time may be secured by the use of reflectors on one side only of the sets of sheets. It will be understood that other suitable heating elements may be substituted for the electrically heated units shown and described.

What I claim is:

1. A method of heating a non-brittle reinforcing sheet of material between a pair of glass sheets, which material softens on the application of heat, and absorbs heat more rapidly than the glass, which consists in exposing the assembly in a horizontal position to direct and reflected heat from a radiant body having a temperature of upwards of 1500 deg. F. so that the reinforcing material is heated more rapidly than the glass and brought to softening temperature.

2. A method of heating a non-brittle reinforcing sheet of material between a pair of glass sheets, which material softens on the application of heat, and absorbs heat more rapidly than the glass, which consists in uniformly exposing the area of one side of the assembly to reflected heat from a radiant body having a temperature upwards of 1500 deg. F. so that the reinforcing material is heated more rapidly than the glass and brought to softening temperature.

3. A method of heating a non-brittle reinforcing sheet of material between a pair of glass sheets, which material softens on the application of heat, and absorbs heat more rapidly than the glass, which consists in uniformly exposing the area of both sides of the assembly to reflected heat from radiant bodies having temperatures upwards of 1500 deg. F. so that the reinforcing material is heated more rapidly than the glass and brought to softening temperature while the glass is maintained at a lower temperature.

JAMES W. KAMERER.